United States Patent [19]

Tanaka et al.

[11] 3,991,138

[45] Nov. 9, 1976

[54] RESIN COMPOSITION FOR THE FORMATION OF LIGHT-DEGRADABLE MULCHING FILM FOR AGRICULTURAL USE

[75] Inventors: Kazunobu Tanaka; Masahiko Kusumoto; Shoji Watanabe, all of Saitama, Japan

[73] Assignee: Daicel, Ltd., Osaka, Japan

[22] Filed: Mar. 24, 1975

[21] Appl. No.: 561,282

[30] Foreign Application Priority Data

Mar. 30, 1974 Japan.............................. 49-36402

[52] U.S. Cl. ..................... 260/889; 260/45.75 R; 260/45.75 N; 260/45.75 N; 260/45.95 R; 260/897 R; 260/DIG. 43; 47/9

[51] Int. Cl.² ....................................... C08L 23/00

[58] Field of Search.......... 260/DIG. 43, 889, 897 R

[56] References Cited

UNITED STATES PATENTS 3,590,528   6/1971   Shepherd..................... 260/DIG. 43
3,850,855   11/1974  Toba et al.................... 260/DIG. 43

FOREIGN PATENTS OR APPLICATIONS 405,216   3/1965   Japan

*Primary Examiner*—Eugene C. Rzucidlo
*Attorney, Agent, or Firm*—Woodhams, Blanchard and Flynn

[57] ABSTRACT

A method of promoting the growth of plants which comprises applying to the surface of a plant growth medium to be exposed to a source of ultraviolet radiation a light-degradable mulching film for agricultural use, comprising a resin composition, whose resin components consist essentially of 1. from 5 to 50 percent by weight of polyisobutylene oxide resin,
2. the balance of a second resin component selected from the group consisting of at least one polyolefin resin and a mixture of at least one polyolefin resin and at least one polydiene resin.

The resin composition can be made into a mulching film which, when exposed to the sunlight, photolytically degrades into a pulverized condition within a selected period of time.

8 Claims, 3 Drawing Figures

RESIN COMPOSITION FOR THE FORMATION OF LIGHT-DEGRADABLE MULCHING FILM FOR AGRICULTURAL USE

BACKGROUND OF THE INVENTION

1. Field of the Invention

This invention relates to a resin composition for the manufacture of mulching films for agricultural use. The resin composition comprises polyisobutylene oxide resin, and either (1) polyolefin resin, or (2) a mixture of polyolefin resin and polydiene resin, and it is characterized by the property that mulching films made of the composition degrade, under the action of sunlight, into a pulverized condition within a selected period of time. Further, the composition can additionally contain an ultraviolet light sensitizer or ultraviolet light absorber.

2. Description of the Prior Art

In the cultivation of agricultural crops, it is known to use mulching films made of synthetic resins, for example, polyethylene, polyvinyl chloride, and polyethylene-polyvinyl acetate copolymers. These films keep soil from lowering in temperature, protect plants from frost, and inhibit evaporation of moisture in the soil, thus promoting the growth of the plants satisfactorily in a shorter period in comparison with the time when mulching films are not used. Additionally, when such films are pigmented so as to be substantially opaque, they inhibit the growth of weeds.

If these mulching films, however, remain in unitary film form at the time of harvest, they are obstacles to convenient harvesting of the crops, for example, by interferring with the movement of a harvesting machine. Moreover, during the hot summer season, they may adversely affect the growth of plants because they absorb the sun's heat and may cause the soil eventually to dry excessively. It is necessary, therefore, to remove the mulching films by hand carefully in such a way as not to injure the crops or plants. This removal operation is very troublesome and expensive. Further, the discarded films are a nuisance to dispose of, in an incinerator, because they generate high temperatures and/or emit corrosive gases and thereby cause damage to the incinerator.

In order to dispense with the trouble of removing the used films from the field and of disposing of them in an incinerator, there have been proposed methods for the manufacture of polyolefin resin films containing a light-degradation accelerator which speeds up photolytic decomposition of the films by sunlight, so that the films become friable within a reasonable period of time. The methods known in the prior art include Japanese Patent Publication Nos. 13707/1970 and 33020/1973, British Patent Specification No. 1 034 076, all for polyolefin resin, and also U.S. Pat. No. 3,590,528 for polybutene-1 film. These films disclosed in the prior art are not fully satisfactory because, for example, some of them degrade to fast to keep the field warm enough, thus failing to accelerate the growth of crops; others degrade into large fragments which are then scattered by wind and rain. As a result, these large fragments become buried in the soil and remain unchanged in form for many years, thereby making subsequent plowing of the field by machine extremely difficult.

We previously discovered that a composition containing polyisobutylene oxide resin, when contacted by ultraviolet light, decomposes initially into powder and eventually into volatile organic compounds, which then finally evaporate and dissipate. See U.S. Pat. No. 3,850,855.

Such a composition of polyisobutylene oxide resin and polyolefin resin is disclosed in Japanese Patent Publication No. 5216/1965, in which, however, the use of the composition for mulching films is not mentioned.

SUMMARY OF THE INVENTION

An object of this invention is to provide a resin composition for the manufacture of agricultural mulching films which composition comprises polyisobutylene oxide resin mixed with either (1) polyolefin resin, or (2) a mixture of polyolefin resin and polydiene resin. The resin composition can easily be made into mulching films which are photolytically decomposable in a desired selected period of time.

Another object of this invention is to incorporate at least one ultraviolet light sensitizer or at least one ultraviolet light absorber in the foregoing resin composition, according to need to control the photolytic decomposition time.

The resin composition, according to the invention, contains, as essentially the only resin components therein, (A) from 50 to 95 percent by weight of either (1) polyolefin resin or (2) a mixture of polyolefin resin and polydiene resin, and (B) the balance, i.e. from 50 to 5 percent by weight, consists of polyisobutylene oxide resin. Optionally, the resin composition can contain from 0.01 to 5 parts by weight of either (a) at least one ultraviolet light sensitizer or (b) at least one ultraviolet light absorber, per 100 parts by weight of the sum of the resin components, i.e., (A) plus (B).

The resin composition is made by blending the foregoing ingredients in a conventional manner. The resin composition can be formed into a mulching film of the desired thickness by any conventional film-forming methods. The resulting film has well-balanced physical properties and desirable light-degradation properties so that it can easily be decomposed by sunlight into a pulverized condition or an easily friable condition within a preselected adjustable period of time. This combination of characteristics stems from the synergistic effect of the polyisobutylene oxide resin, particularly in combination with an ultraviolet light sensitizer, both of which accelerate photolytic decomposition of the film, and on the other hand, the polyolefin resin or mixture of polyolefin and polydiene resin, particularly in combination with an ultraviolet light absorber, all of which are resistant to photolytic decomposition. The film can be widely used in the fields of use in which the same effective qualities as those of conventional mulching films are required, for example, as ground covers, agricultural tunnels and bags for protecting seedlings and graftings. In addition, the film can be used for making garbage bags and many other related uses.

Generally, mulching films for agricultural use are extensively used in the spring and autumn for growing vegetables such as lettuce, Chinese cabbage, common carrot and taro dry field crops such as peanut, soybean, sweet potato, potato, corn and sugar cane, flowers, fruit-trees, tea plants, tobacco, bedding out young rice plants, and the like. Available deta indicates that the films for these uses should remain unchanged in form, or retain their structural integrity as a unitary film, at least for 15 to 90 days because if the films decompose in a shorter time period than this range, they are of little practical use.

We have discovered that a mulching film composed of polyisobutylene oxide resin, which undergoes rapid photolytic decomposition, and either polyolefin resin or a mixture of polyolefin resin and polydiene resin, which conversely is resistant to photolytic decomposition, when they are blended at a quantitatively controlled weight ratio and are formed into films which decompose in a desired controllable period of time.

We have made and tested a film of this type, by placing it outdoors early in April in the Kanto area of Japan for exposure to ambient weather conditions. As a result of these tests, we have determined that films made of various resin compositions having various mixing ratios of the resin components, are decomposed by sunlight in an appropriate period of time within the range of from about 7 days to about 6 months. In addition, we have discovered that, if only the film contains polyisobutylene oxide resin, the film becomes friable and it can be pulverized easily after it has undergone such decomposition due to exposure to sunlight.

Thus, we have discovered a resin composition for making a mulching film, whose light degradation period can be set in advance and which will readily decompose under the action of sunlight into powder.

One of the characteristics of the invention is that the time when significant decomposition begins, or loss of structural integrity of the film begins, is controllable by regulating the mixing weight ratio of the two resin components. The photolytic decomposition properties of the resin ingredients oppose each other, that is, the polyisobutylene oxide resin undergoes rapid photolytic decomposition, whereas the polyolefin resin and a mixture of polyolefin and polydiene resins are resistant to photolytic decomposition.

Another feature of the invention is the use of the additives, i.e., at least one ultraviolet light sensitizer or at least one ultraviolet light absorber, in the composition to provide further control over the onset of film decomposition. The ultraviolet light sensitizer or the ultraviolet light absorber can be added to the resin composition in various situations, such as when (1) the mulching film possesses desirable physical properties, but possesses an unsatisfactory photolytic decomposition period of time, or (2) the mulching film possesses desirable physical properties and photolytic decomposition period, but is undesirably expensive. One of these additives, when used in the foregoing case (1), properly adjusts the photolytic decomposition period of the film to meet the requirements of users, and in the case (2), lowers its manufacturing cost by replacing more expensive components, yet it can maintain unchanged the original desired physical properties and the photolytic decomposition period of the film.

This invention provides a resin composition for a mulching film for agricultural use which consists essentially of 5 to 50 percent by weight of polyisobutylene oxide resin, and the balance, i.e., 50 to 95 percent by weight of polyolefin resin or of a mixture of polyolefin resin and polydiene resin. The film is characterized by the properties that it retains its film form intact for about 15 to 90 days, and then it loses its structural integrity and is converted into a friable or pulverized form by the action of sunlight. The terms of 15 to 90 days, during which the film remains intact, is variable depending on the specific resin composition used and it can be changed, as needed, to meet the requirements of the particular crop involved.

The film thickness is not critical, but preferably is from 10 to 100 microns.

The ultraviolet light sensitizer or ultraviolet light absorber is incorporated in the foregoing basic resin composition in the ratio of 0.01 to 5 parts by weight of the additive per 100 parts by weight of the two film-forming resin components. The amount of additive varies depending on such factors as the quality and degree of polymerization of the resin components, the method for manufacturing film, the film thickness, the intended use of the film and so forth.

Samples of films of 30 microns in thickness have been made from resin compositions containing an ultraviolet light sensitizer or an ultraviolet light absorber within the ratio set forth above. According to ASTM E-42-EH, the samples were exposed to a carbon arc lamp sunshine weather-o-meter (trademark WE-SUN-HC, of Tokyo Rika Kogyo Co.) at 60° C, using different exposure times for different samples. Of the films thus tested, it was found that those films whose elongation was reduced to 100 percent as a result of 50 to 300 hours exposure by said weather-o-meter, are mulching films suitable for agricultural use and they have the desired photolytic decomposition properties for the purposes of this invention.

The polyisobutylene oxide resin employed in this invention has a reduced specific viscosity (n sp/c) of 0.8 dl/g or more determined at 120° C in ortho-dichlorobenzene. It can be manufactured by known processes, for example, by the process described in *Encyclopedia of Polymer Science and Technology* edited by Norbert M. Bikales, 1969, Volume 6, pages 191–193, Interscience Publishers, a division of John Wiley and Sons Inc., New York, and others.

The polydiene resins usable in this invention include poly-1,4-butadiene, poly-cis-1,2-butadiene, polyisoprene and copolymers thereof.

The polyolefin resins usable in this invention are polyethylene, polypropylene, polybutene-1, poly-4-methylpentene-1, polyisobutylene, ethylene-propylene copolymers, ethylene-vinyl acetate copolymer, ethylene vinyl chloride copolymer, ethylene-acrylic acid copolymers, and copolymers and mixtures thereof.

The ultraviolet light sensitizer is not specifically limited and any of a large number of known ultraviolet light sensitizers compatible with the resin components can be used. Preferred sensitizers include, for example, benzophenone; quinone compounds, such as p-benzoquinone, anthraquinone, $\beta$-methyl anthraquinone, naphthoquinone, and 1,2-benzanthraquinone; aryl nitro compounds, such as o-nitro benzaldehyde, and nitro naphthalene; and acetylacetone chelates, such as acetylacetone nickel chelate, and acetylacetone manganese chelate.

The ultraviolet light absorber also is not restricted to any extent and any of a large number of known ultraviolet light absorbers compatible with the resin components can be used. Commonly used absorbers are, for example, salicylic esters, such as phenyl salicylate, 4-tertiary butyl phenyl salicylate, p-octyl phenyl salicylate; substituted benzophenones such as 2-hydroxy-4-methoxy benzophenone, 2-hydroxy-4-methoxy-2-carboxy benzophenone, 5-chloro-2-hydroxy benzophenone, and 2,2'-dihydroxy-4,4'-dimethoxy benzophenone; and benzotriazoles such as 2-(2'-hydroxy-5'-methylphenyl)benzotriazole, 2-(2-hydroxy-3-tertiary butyl-5'-methyl phenyl)-5-chloro benzotriazole, and 2-(2'-hydroxy-3',5'-ditertiary butyl phenyl)-5-chloro benzotriazole.

Various conventional additives such as antioxidants, dyestuffs, pigments, lubricants, softening agents, foaming agents, and others, can also be incorporated in the conventional amounts in the resin composition.

Any of the methods used for blending resins can be used for blending the resin components to form the resin composition of this invention, for example, the dry or wet processes for kneading resin powders, the Banbury mixing process, the melt-kneading process employing a biaxial extruder, and the hot-roll process.

The mulching film can be made by any of the conventional film-forming processes, such as the flat-die process, inflation process, and monoaxial or biaxial orientation processes.

The mulching film can be embossed, punched, and laminated, if desired. A punched film is particularly preferred.

The photolytically decomposable mulching film of this invention can be suited for all agricultural products to which conventional mulching films have been adapted. The mulching film of this invention is used so as to cover therewith the surface of a plant growth medium such as soil, water, a stock for grafting and a fruit-tree and to promote the growth of plants. As effective sources to photolytically decompose the mulching film, there can be used all ultraviolet radiation such as sunlight, a mercury lamp, a carbon arc, and a xenon lamp.

The mulching film decomposable by sunlight, according to the invention, can be used in various ways, for example, in the form of containers for growing vegetables, bags for protecting seedlings or graftings, garbage bags, and so forth.

No definite reason has been discovered yet for the effect achieved by this invention. The data thus far obtained, however, suggests that polyisobutylene oxide resin by itself, when activated by ultraviolet radiation, undergoes photo-oxidative degradation and then decomposes, and eventually transforms into volatile substances, a fact which we and our coworkers published in *Chemistry Letters*, pages 629–632, 1973, of the Chemical Society of Japan, and also in *Preprints of 22nd Polymer Symposium in Japan*, Volume 1, pages 223–228, November, 1973, of Polymer Society of Japan.

Our data also indicates that the polyolefin resin which is fairly resistant to ultraviolet light, when blended with the polyisobutylene oxide resin and formed into a film, can properly control the light decomposition period of the film. It is believed that when the film containing the polyisobutylene oxide resin and the polyolefin resin alone or with the polydiene resin is exposed to sunlight, the polyisobutylene oxide resin undergoes a photo-oxidation reaction, and then degrades and simultaneously produces free radical-possessing substances. The radicals then cause or promote a photooxidation reaction of the polyolefin resin and polydiene resin. The polyisobutylene oxide resin also partially volatilizes away from the film when exposed to sunlight, thus accelerating transformation of the film into powder.

In accomplishing this invention, we have also studied the correlation between the outdoor exposure test and the light-decomposition indoor test. We have found that the period of 15 to 90 days during which time the film tested outdoors in the Kanto district of Japan in spring and autumn maintains its film form unchanged, is equivalent to a period of 50 to 300 hours exposure of the film indoors to a standard sunshine carbon arc weather-o-meter (for example, WE-SUN-HC made by Tokyo Rika Kogyo Co., Japan) at 60° C, with a water spray for 15 minutes every two hours. The period of 15 to 90 days signifies the period during which time the film, placed outdoors and exposed to ambient weather conditions, remains unchanged in its film form, after which the film begins to have cracks and crevices, and then deteriorates into an easily friable or powder condition.

The foregoing period can be determined by examining the film in terms of its tensile elongation, folding endurance, impact resistance, physical structural changes, and changes in degree of polymerization. Its surface appearance can also be inspected by an electron microscope to determine the period. The observation of the film in these aspects is explained in many reference materials, for example, *Weathering and Degradation of Plastics*, by Pinner, pages 57–65, 1966, published by Gordon and Breach Publisher Inc.

It is believed that an examination of the film in terms of its tensile elongation is the most effective criteria for judging the disintegration period of the film. Accordingly, for this test there was used the Tensilon UTM-II, a testing machine manufactured by Toyo Baldwin Co. The test results indicate that the time, within the range of 50 to 300 hours, during which the film is exposed indoors to the weather-o-meter light and stretched at 20 mm per minute, that it takes to reduce its tensile elongation of the film to 100 percent corresponds very well to the time, within the range of 15 to 90 days, during which the same film, exposed outdoors to sunlight, takes to begin to crack.

Figure 1:
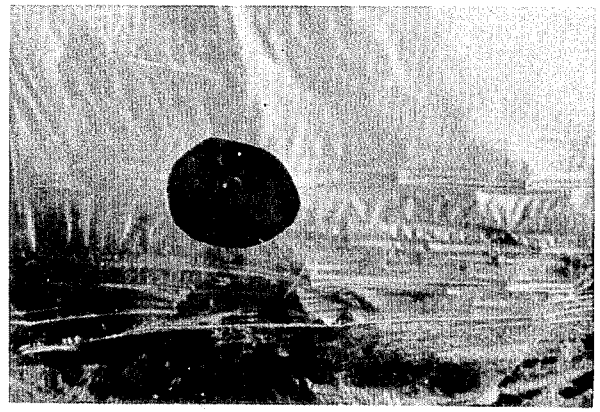
FIG. 1 is a photograph of the film, according to the invention, as initially manufactured. The photograph shows a fragment of a film having a hole therethrough.
Figure 2:
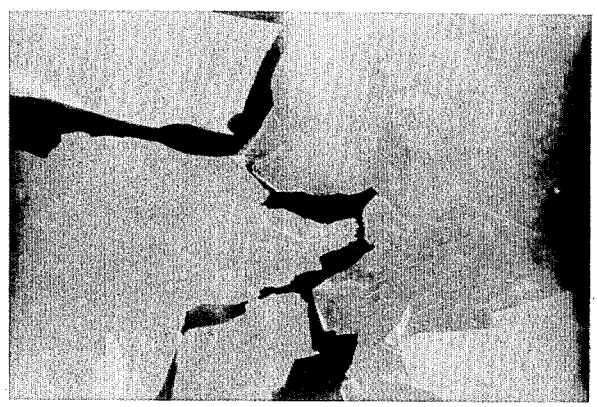
FIG. 2 is a photograph of the film after it has broken into large fragments after exposure to light.
Figure 3:
FIG. 3 is a photograph of the film after it has further broken into small fragments after further exposure to light.

This invention is further described in more detail by reference to the following illustrative examples, but not limited to them.

EXAMPLE 1

Twenty parts by weight of polyisobutylene oxide resin powder having a reduced specific viscosity of 3.5 dl/g determined in o-dichlorobenzene at 120° C, and 80 parts by weight of polypropylene resin powder, trademark: NOBLEN FS-2011, of Sumitomo Chemical Co., Ltd., were thoroughly blended. Into this mixture, there were added 0.9 percent by weight, based on the weight of the isobutylene oxide resin powder, of tetrakis [methylene-3-(3,5-ditertiary butyl-hydroxy phenyl) propionate] methane, and 0.1 percent by weight, on the same basis, of dibenzyl sulfide as an anti-oxidant.

The resulting composition was melt-extruded and formed into a transparent film, 60 cm wide, 40 m long, and approximately 30 microns thick. Holes of 5 cm in diameter were punched in the film at longitudinal intervals of 30 cm. The film then was placed on three fields of a farm in the Kanto area of Japan. Seeds of corn were planted through the holes on Apr. 5, 1973. On May 31 of that year, the film began to deteriorate and the wind further caused crevices and cracks therein. Subsequently by June 6, most of its parts which had been exposed to the sunlight split into pieces, some of which thereafter mingled with the soil and others of which were scattered in the form of flakes by the wind. By June 13, 1973, nearly all of the pieces of the film had disappeared completely. In addition, the corn grew very well. It was found that the total weight of economical female ears per are of corn in the field covered with the light-degradable mulching film was 160.0 kg/are. While, that of corn in the control field covered with polyethylene film of 20 micron thickness was 137.2 kg/are. In comparison, the female ears of the former were generally larger than those of the latter. The reason will be explained as follows: in the latter case, the mulching film was not decomposed in summer, whereby the film imparted to corn high temperature and drought harm. On the other hand, the former mulching film was photolytically decomposed, so that it made the production of corn increase. Accordingly, the film proved itself practical for use as a light-degradable mulching film for agricultural use.

At the outset in laboratory tests, the film possessed a tensile elongation of 350 percent when measured at a speed of 10 mm per minute by the Tensilon UTM-II, of Toyo Baldwin Co. The initial tensile elongation of 350 percent, however, reduced to 100 percent after 180 hours exposure by WE-SUN-HC, a standard sunshine carbon weather-o-meter, made by Tokyo Rika Kogyo Co. at 60° C, with shower sprays on the film for 15 minutes every two hours.

EXAMPLES 2–6

Polyisobutylene oxide resin powder and polypropylene resin powder were respectively blended at the ratios shown in Table 3 in the same way as in Example 1. Into these mixtures, the antioxidant and the ultraviolet light absorber or ultraviolet light sensitizer as listed in Table 3 were also added. The resulting compositions were formed into transparent films. Table 3 indicates the periods of time of exposure to the carbon arc weather-o-meter required to reduce the tensile elongations of the films to 100 percent under the same conditions as in Example 1.

The films shown in Table 3, which were placed on a surface of the same outdoor ground as in Example 1 and exposed to sunlight from Apr. 1, 1973 to June 10, 1973, remained high in strength and in elongation and resisted rain and wind, and showed a remarkable effect of maintaining the soil temperature properly while the film remained intact for the number of days shown in Table 3. After the passage of the indicated number of days, the films began to exhibit visible signs of light degradation, and then they cracked further into powder and fragments capable of being plowed into a field. These test results show that the films are excellent as mulching films and that their light degradation period can be predetermined in advance.

The effects of these light-degradable mulching films on agricultural products will be explained below. The mulching film of Example 3 was adapted to the test growth of sweet potato in the same field as in Example 1. It was found to photolytically decompose in about one month since planting dated May 4. The increase of the product was observed, which is considered to lead from the same reason as in Example 1, as well as the operation of removing the film could omitted. Separately, the mulching film was adapted to the growth of peanut and taro, and the effects of both omitting film-removing operation and the increase of the product were observed, which is shown in Tables 1 and 2.

Table 1

| mulching film | Growth test of peanut | weight of total grain kg/are |
|---|---|---|
| film of Example 4 | | 28.7 |
| polyethylene film | removed after two months | 29.7 |
| | not removed through the test* | 21.0 |
| no | | 24.5 |

Table 2

| mulching film | Growth test of taro | amount of product kg/are |
|---|---|---|
| film of Example 4 | | 113.4 |
| polyethylene film | removed after two months | 96.0 |
| | not removed through the test* | 78.3 |

*Note: not cultured

Table 3

| Materials | Films | | | | |
|---|---|---|---|---|---|
| | Example 2 | Example 3 | Example 4 | Example 5 | Example 6 |
| Polyisobutylene Oxide (parts by weight) | 50 | 40 | 30 | 20 | 10 |
| Polypropylene (parts by weight) | 50 | 60 | 70 | 80 | 90 |
| Agent for Controlling Light-degradation | none | Ultraviolet light absorber Tinubin 328 | Ultraviolet light absorber Tertiary butyl phenyl salicylate | Ultraviolet light sensitizer Anthraquinone | none |
| | | 2.0 parts by weight | 0.2 parts by weight | 0.2 parts by weight | |
| Test Results | | | | | |
| Elongation of original film (percent) | 250 | 320 | 400 | 360 | 410 |
| Weather-o-meter exposure period until the film tensile elongation reduced to 100% (hours) | 55 | 110 | 140 | 70 | 210 |
| A. Period during which the film form remained intact during outdoor exposure (days) | 18 | 33 | 42 | 21 | 65 |

Table 3-continued

| Materials | Films | | | | |
|---|---|---|---|---|---|
| | Example 2 | Example 3 | Example 4 | Example 5 | Example 6 |
| B. Further period, after period A, required for the film to break into pieces on continued outdoor exposure (days) | 2 | 4 | 6 | 3 | 10 |

COMPARATIVE EXAMPLE 1

Polypropylene resin powder, trademark: NOBLEN FS-2011, of Sumitomo Chemical Co., Ltd., was made into a film in the same way as in Example 1. The elongation of the film initially was 420 percent, and after it was exposed to the weather-o-meter for 400 hours, the elongation was 270 percent. The film did not crack after exposure outdoors for three months under the same conditions as in Example 1.

COMPARATIVE EXAMPLE 2

A film was prepared in the same manner as in Comparative Example 1 from a composition consisting of three parts by weight of the polyisobutylene oxide resin in Example 1, 0.2 part by weight of β-methyl anthraquinone as an ultraviolet light sensitizer and 97 parts by weight of the polypropylene resin in Comparative Example 1. The film, after exposure outdoors for 26 days, split here and there, and broke into relatively large fragments, which then were scattered about by the wind without pulverizing during the following week. Thus, this film is unsuitable for use as a light-degradable agricultural mulching film.

COMPARATIVE EXAMPLE 3

Forty parts by weight of the foregoing polypropylene resin, 60 parts by weight of polyisobutylene oxide resin having a reduced specific viscosity of 2.6 dl/g, and the same antioxidant used in Example 1 were blended and the composition was made into a film of 20 micron thickness. The film started to break apart after 10 days exposure to sunlight and then after the passage of two more days, split partially into fragments. The initial tensile elongation of the film was 270 percent, and its tensile elongation was reduced to 15 percent after exposure for a total of 40 hours to the carbon arc weather-o-meter under the conditions explained in Example 1. The film degraded upon exposure to sunlight so fast that it failed to keep the ground that it covered warm enough. This film is unsatisfactory as a mulching film for agricultural use.

EXAMPLE 7

A composition consisting of 25 parts by weight of polyisobutylene oxide resin mixed with the same antioxidant used in Example 1, 75 parts by weight of polyethylene, trademark: HIZEX 21COLP, of Sumitomo Chemical Co., Ltd., and 0.1 part by weight of benzophenone as an ultraviolet light sensitizer was made into film, which then was exposed outdoors under the same conditions as in Example 1. After the passage of 72 days, the film started to break apart due to photolytic decomposition and thereafter it was completely broken into pieces after 10 more days. The initial elongation of the film was 280 percent and the elongation was reduced to 100 percent when exposed to the carbon arc weather-o-meter for 240 hours.

COMPARATIVE EXAMPLE 4

One hundred parts by weight of polyethylene and 0.5 part by weight of benzoquinone as an ultraviolet light sensitizer were blended and made into a film of 2.0 micron thickness in the same manner as in Example 7. The film cracked when exposed outdoors for about two months under the same conditions as in Example 7, but it did not disintegrate into pieces thereafter, and finally was scattered about by strong wind.

EXAMPLES 8–11

Films, each of which was 25 microns in thickness, having the respective resin compositions as shown in Table 2, were prepared and they were subjected to the same weather-o-meter test as in Example 1 and also the same outdoor test as explained in Example 2. The results given in Table 2 were obtained. Each of these films is suitable for agricultural use, and is a light degradable mulching film according to this invention. The polyisobutylene oxide resin used had a reduced specific viscosity of 3.2, measured in o-dichlorobenzene at 120° C. In this composition, there was used the same antioxidant as employed in Example 1.

Table 4

| Materials and Test Results | Film | | | |
|---|---|---|---|---|
| | Example 8 | Example 9 | Example 10 | Example 11 |
| Polyisobutylene Oxide (parts by weight) | 40 | 30 | 30 Polypropylene (NOBLINE FS-2011 made by Sumitomo Chemical Co., Ltd.) | 20 Polyethylene (Hizex 2100 made by Sumitomo Chemical Co., Ltd.) |
| Polyolefin Resin (parts by weight) | Ethylene propylene rubber (ESPRENE made by Sumitomo Chemical Co., Ltd.) 60 | Polypropylene (NOBLEN FS-2011 made by Sumitomo Chemical Co., Ltd.) 50 | 60 Polyisobutylene rubber (PV-30SH made by Nichiyu Chemical Co.) | 50 Ethylene-vinyl acetate copolymer (EVAFLEX-260 made by Sumitomo Chemical Co., Ltd.) |

Table 4-continued

| Materials and Test Results | Film | | | |
|---|---|---|---|---|
| | Example 8 | Example 9 | Example 10 | Example 11 |
| Polydiene Resin (parts by weight) | None | Cis-1, 2-polybutadiene (S-810 made by Japan Synthetic Rubber Co.) 20 | 10 None | 30 None |
| Agent for Controlling Light-degradation (parts by weight) | Ultraviolet light absorber 2-hydroxy-4-methoxy-2'-carboxy benzophenone 0.1 | None | Ultraviolet light sensitizer P-benzoquinone 0.2 | None |
| weather-o-meter exposure period until the film tensile elongation is reduced to 100% (hours) | 105 | 85 | 95 | 260 |
| A. Period during which the film form remained intact during outdoor exposure (days) | 32 | 25 | 31 | 80 |
| B. Further period, after period A, required for the film to break into pieces on continued outdoor exposure (days) | 4 | 3 | 4 | 8 |

The embodiments of the invention in which an exclusive property or privilege is claimed are defined as follows:

1. A resin composition for the formation of light degradable mulching films for agricultural use, whose resin components consist essentially of
    1. from 5 to 50 percent by weight of polyisobutylene oxide resin, having a reduced specific viscosity of at least about 0.8 dl/g, determined at 120° C in o-dichlorobenzene,
    2. the balance is a mixture of at least one polyolefin resin and at least one polydiene resin.

2. A resin composition as claimed in claim 1, in which said polyolefin resin is selected from the group consisting of polyethylene, polypropylene, polybutene-1, poly-4-methylpentene-1, polyisobutylene, ethylene-propylene copolymers, ethylene-acrylic acid copolymers, copolymers and mixtures thereof, and said polydiene resin is selected from the group consisting of poly-1,4-butadiene, poly-cis-1,2-butadiene, polyisoprene and copolymers thereof.

3. A resin composition as claimed in claim 1 additionally containing at least one substance selected from the group consisting of antioxidants, dyestuffs, lubricants, softening agents, and foaming agents.

4. A resin composition as claimed in claim 1 additionally containing from 0.01 to 5 parts by weight, per 100 parts by weight of the sum of (1) and (2), of an ultraviolet light sensitizer or an ultraviolet light absorber.

5. A resin composition as claimed in claim 4, in which said ultraviolet light sensitizer is selected from the group consisting of benzophenone, p-benzoquinone, naphthoquinone, anthraquinone, β-methyl anthraquinone, 1,2-benzanthraquinone, o-nitro benzaldehyde, nitro naphthalene, acetylacetone copper chelate, acetylacetone cobalt chelate, acetylacetone nickel chelate, and acetylacetone manganese chelate.

6. A resin composition as claimed in claim 4 in which said ultraviolet light absorber is selected from the group consisting of phenyl salicylate, 4-tertiary butyl phenyl salicylate, p-octyl phenylsalicylate, 2-hydroxy-4-methoxy benzophenone, 5-chloro-2-hydroxy benzophenone, 2-hydroxy-4-methoxy-2-carboxy benzophenone, 2,2'-dihydroxy-4,4'-dimethoxy benzophenone, 2' (2'-hydroxy-5'-methyl phenyl)-benzotriazole, 2-(2-hydroxy-3-tertiary butyl-5'-methyl phenyl)-5-chloro benzotriazole, and 2-(2'-hydroxy-3',5'-ditertiary butyl phenyl)-5-chloro benzotriazole.

7. A film made of a resin composition as claimed in claim 1 and being of from 10 to 100 microns in thickness.

8. A resin composition as claimed in claim 1, consisting essentially of 30 percent by weight of said polyisobutylene oxide, 50 percent by weight of polypropylene and 20 percent by weight of poly-cis-1,2-butadiene.

* * * * *